United States Patent [19]

Carriker et al.

[11] Patent Number: 5,529,438
[45] Date of Patent: Jun. 25, 1996

[54] GEOSYNTHETIC CLAY LINER WITH MODIFIED EDGES FOR IMPROVED SEALING

[75] Inventors: Richard W. Carriker, Woodstock; Mark Clarey, Dalton, both of Ga.

[73] Assignee: Clem Environmental Corp., Chicago, Ill.

[21] Appl. No.: 247,939

[22] Filed: May 24, 1994

Related U.S. Application Data

[63] Continuation-in-part of Ser. No. 6,222, Jan. 19, 1993, Pat. No. 5,350,255.

[51] Int. Cl.$^6$ ........................................ E02D 3/12
[52] U.S. Cl. .................. 405/270; 52/169.14; 405/38; 405/129
[58] Field of Search .................. 405/270, 43, 45, 405/129; 52/169.14, 169.11

[56] References Cited

U.S. PATENT DOCUMENTS

| | | |
|---|---|---|
| 3,160,512 | 12/1964 | Cash et al. . |
| 3,445,322 | 5/1969 | Saiia et al. .................... 52/169.14 X |
| 4,467,015 | 8/1984 | Clem .................... 405/263 X |
| 4,565,468 | 1/1986 | Crawford .................... 405/270 |
| 4,810,573 | 3/1989 | Harriett .................... 52/169.14 X |
| 4,943,185 | 7/1990 | McGuckin et al. .................... 405/45 |
| 5,063,100 | 11/1991 | Alexander . |
| 5,174,231 | 12/1992 | White . |
| 5,180,255 | 1/1993 | Alexander .................... 405/270 |
| 5,187,915 | 2/1993 | Alexander .................... 52/169.14 |
| 5,350,255 | 9/1994 | Carriker .................... 405/270 |

Primary Examiner—Dennis L. Taylor
Attorney, Agent, or Firm—Marshall, O'Toole, Gerstein, Murray & Borun

[57] ABSTRACT

A clay liner is provided for use in constructing low permeability barriers in the bottom of landfills and man-made bodies of water. The liner is provided in the form of a layer of bentonite preferably disposed between a primary carrier sheet and a cover sheet. At least one outer edge of either the cover sheet or the primary carrier sheet is made from a material that allows substantial bentonite migration through or includes a slit that enables bentonite to migrate through while the remaining areas of the cover sheet or primary carrier sheet are fabricated from a fabric that does not permit substantial bentonite migration. When two liners are disposed adjacent to each other in the bottom of the landfill or pond, the two liners are overlapped so that the more open portion of one liner engages the adjacent liner. Upon activation, the bentonite migrates through the more open fabric to create a seal between the two adjacent liners. The result is a self-sealing geosynthetic clay liner system.

18 Claims, 4 Drawing Sheets

GEOSYNTHETIC CLAY LINER WITH MODIFIED EDGES FOR IMPROVED SEALING

This is a continuation-in-part of application Ser. No. 08/006,222, filed Jan. 19, 1993, now U.S. Pat. No. 5,350,255.

This invention relates generally to an improved liner used to create a low permeability barrier in the bottom of landfills and man-made bodies of water such as man-made lakes and man-made ponds. More specifically, this invention relates to an improved clay liner for landfills and ponds made with two sheets and a layer of bentonite suspended therebetween. At least one of the sheets, either the carrier sheet or the cover sheet, includes at least one longitudinal outer section that allows bentonite migration through it. The structure of the outer longitudinal section allows for increased migration of activated bentonite and allows the outer longitudinal section of the clay liner to effectively seal with an outer section of an adjacent clay liner.

BACKGROUND OF THE INVENTION

The present invention relates to clay liners which are used to form a very low permeability barrier. The specific problem addressed by the present invention is how to create a seal between adjacent clay liners to provide a continuous and low permeability clay barrier.

A low permeability barrier is required in the construction of landfills in order to retain any liquid, known as leachate, contained within the waste material and keep the leachate out of the water table. Further, a low permeability bottom barrier is required in the construction of many man-made lakes and ponds to preclude water loss through seepage.

The use of bentonite to create a low permeability barrier in landfills and ponds is well known. Bentonite is a clay material which occurs naturally and it expands upon being exposed to or activated by water. When the bentonite absorbs water and expands, it is capable of forming a barrier with low permeability to fluid migration if the bentonite is properly contained.

Geosynthetic clay liners may be made with one or two sheets. The primary backing or carrier sheet is normally the more durable material and is often disposed below the bentonite layer when installed in the landfill. The cover sheet, also referred to as scrim, is normally less durable than the carrier sheet. Upon installation, the cover sheet may face up or down and the carrier sheet may face up or down, depending upon the specific design of the landfill. A layer of bentonite supported by at least one carrier sheet or disposed between two sheets (cover sheet and carrier sheet) is often referred to as a geosynthetic clay liner or GCL.

Workers will spread rolls of geosynthetic clay liners out over the area to be covered in a manner similar to the installation of carpet. In the past, in order to effectuate a seal between adjacent liners, it has been necessary to overlap adjacent rolls of liner material. In liners where the bentonite is suspended between two sheets by a needle-punching process, the seams must be augmented with granular bentonite, or other means, or liquids will leak downward at the seams created between adjacent rolls of liner material. The augmentation with granular bentonite (or other means) constitutes an extra installation step and therefore is costly in terms of time and money. Further, these seam augmentation procedures are dependant upon the construction crew following exacting installation procedures to effectuate a reliable seam.

In order for the activated bentonite to create a low permeability barrier, it must be properly contained. The bentonite may be contained between two sheets, a carrier sheet and a cover sheet. The bentonite may be held in place by glue applied to the carrier sheet or by needle-punching the cover sheet to the carrier sheet or by stitching the carrier sheet to the cover sheet or a combination thereof. The sheets may be manufactured from durable woven or non-woven materials or sheets that do not permit the bentonite to substantially migrate through the material. By properly containing the bentonite between two sheets that do not allow for substantial migration of the bentonite, the bentonite is properly contained and, upon activation by water, the bentonite will swell and form a low permeability barrier between the two sheets.

Depending on the construction of the fabrics or materials used, the lower or bottom sheet may not allow for the bentonite to migrate through to create a low permeability seam and simply overlapping adjacent liners may not insure that the proper seal will be attained between the two adjacent liners. In other words, laying an outer portion of the lower sheet of one liner on top of an outer portion of an upper sheet of an adjacent liner may not insure that a proper seal will be obtained between the two liners. In the case where the materials contained within the landfill include hazardous waste, a lack of a proper seal will result in leakage and will have serious ramifications.

Thus, there is a need for a bentonite clay liner, or a geosynthetic clay liner, that will ensure that a proper seal is obtained between two adjacent liners as the liners are installed in the bottom of a landfill or pond. Preferably, the geosynthetic clay liners should be self-sealing when adjacent liners are overlapped thereby insuring that no "seams" will leak and further providing a geosynthetic liner system that is quickly and efficiently installed.

BRIEF DESCRIPTION OF THE INVENTION

A geosynthetic clay liner is provided that includes a layer of bentonite disposed between a carrier sheet and a cover sheet. At least one sheet, either the carrier sheet or the cover sheet, is made of material with two distinct structures. The central portion or the bulk portion of the sheet precludes the substantial migration of bentonite through it and contains the bentonite. The central portion includes a relatively closed structure and therefore precludes substantial bentonite migration through it. In contrast, at least one longitudinal outer edge or longitudinal section of the said sheet has a more open structure and allows substantially more bentonite to migrate through it. The more open outer longitudinal section is the overlap section which will be laid on top of or underneath an adjacent geosynthetic clay liner to create a seal between adjacent liners.

The more open structure of the outer section may be in the form of a more open weave, a series of perforations, a slit, cut or groove or other means for enabling bentonite to migrate through the sheet so it can form a seal with our adjacent liner.

In one embodiment, at least one sheet is fabricated from non-woven material. A slit is cut or melted adjacent to an outer edge of the non-woven sheet thereby providing the more open outer longitudinal section next to the more closed central portion. In contrast, if the sheet is fabricated from woven material, then the preferred structure includes a tightly woven central portion with a loosely woven outer longitudinal section. Either way, bentonite is permitted to migrate through a slit or through an open weave so it can effectuate a seal with an adjacent, overlapping liner.

Upon activation, the bentonite swells to form the low permeability barrier. Because the central portion of one sheet includes a closed structure, the bentonite is substantially contained and does not migrate through the central portion of the sheet. However, because the outer longitudinal section, or the overlap section, is more open or is loosely woven or includes a longitudinal slit or groove, the activating bentonite substantially migrates through it and engages the adjacent geosynthetic clay liner that has been overlapped by the outer longitudinal section or outer edge. The substantial migration of the bentonite through the longitudinal section ensures that an effective seal is created between one geosynthetic clay liner and an adjacent geosynthetic clay liner.

As noted above, the open structure of the outer longitudinal section or outer edge may be obtained by cutting or melting a slit along the outer edge of non-woven fabric, or, if woven fabric is used, by employing a looser weave (i.e. lower warp yarn count) than the closed structure of the central portion (high warp yarn count). Also, the more open structure of the outer longitudinal section may be obtained by a needle-punching or perforation process that creates a structure that will allow for substantial bentonite migration through it. The needle-punching and perforation methods are especially adaptable for geosynthetic clay liners made without gluing the bentonite to one of the sheets (i.e. a needle-punched liner). Both the loosely woven and needle-punched/perforation sections are referred to as the open sections below and the term "open" is meant to indicate ease of substantial bentonite migration. In contrast, the term "closed" is meant to indicate a low permeability structure that does not permit substantial bentonite migration.

In terms of industry nomenclature, the terms primary textile and primary carrier sheet are often used interchangeably. Unless otherwise noted, the primary carrier will refer to the more durable textile or sheet of a geosynthetic liner and is normally disposed downward upon installation. However, primary carrier sheets may be disposed upward upon installation, depending upon the intended purpose of the geosynthetic liner. Also, the terms secondary textile, secondary carrier sheet, scrim and cover sheet may also be used interchangeably. Unless otherwise note, the term cover sheet will refer to the textile or sheet that is connected or otherwise attached to the primary carrier sheet with a layer of bentonite disposed therebetween. Normally, the cover sheet is disposed upward upon installation, but may also be disposed downward, depending upon the intended purpose of the geosynthetic liner.

Assuming the cover sheet is disposed upward when installed, if the more open longitudinal section is provided at an outer edge of the cover sheet, the outer edge of the cover sheet is disposed beneath an outer edge of an adjacent geosynthetic clay liner so that the more open longitudinal section engages at least an outer edge of the adjacent liner. As the bentonite is activated, it will migrate upward to engage and seal with the underside of the primary carrier sheet of the adjacent liner.

In contrast, if the more open longitudinal section or slit is provided at an outer edge of a lower primary carrier sheet, the outer edge of the lower primary carrier sheet is disposed on top of an outer edge of an adjacent geosynthetic clay liner so that the more open longitudinal section or slit engages at least an upper outer edge of the cover sheet of the adjacent liner. The bentonite, upon activation, will migrate downward through the longitudinal section or slit and engage a portion of a cover sheet of an adjacent geosynthetic clay liner. Any "seam" between the two adjacent geosynthetic clay liners is eliminated by the bentonite migrating through the more open longitudinal section or slit and engaging the adjacent geosynthetic clay liner.

More than one open longitudinal section or slit may be provided with each geosynthetic clay liner. For example, a more open longitudinal section or slit may be provided at each outer edge of the upper cover sheet. In this case, only half of the liners will require the more open longitudinal sections or slits and liners without the more open longitudinal sections or slits would be disposed on either side and overlap on top of the more open longitudinal sections or slits. Two open longitudinal sections or slits may also be disposed at either edge of the lower carrier sheets and these longitudinal sections or slits would overlap on top of adjacent cover sheets with or without open longitudinal sections or slits. The more open longitudinal section or slit may be disposed at any edge of the geosynthetic clay liner and more than one open longitudinal section or slit may be provided with each geosynthetic clay liner.

One preferred method for creating a continuous bentonite layer that is substantially impervious to migrating liquids includes the use of geosynthetic clay liners as described above. If the liners include only one open longitudinal section disposed on an outer edge of the upper cover sheet, each liner is rolled out and the open longitudinal section is overlapped, or disposed below, an outer edge of a lower carrier sheet of an adjacent geosynthetic clay liner. Because only one open longitudinal section is provided with each geosynthetic clay liner, each "seam" will include only one open longitudinal section.

With respect to the installation of the slits or cuts into a non-woven sheet, the slit may be installed with a cutting blade or the sheet may be melted if the non-woven sheet is made of a material that is easily melted, such as polyethylene.

It is therefore an object of the present invention to provide an improved geosynthetic clay liner with at least one self-sealing outer edge.

It is also an object of the present invention to provide an improved geosynthetic clay liner that will seal with an adjacent geosynthetic clay liner, thereby avoiding leakage at the seams between adjacent liners.

Yet another object of the present invention is to provide an improved system for providing a low permeability layer of bentonite at the bottom of landfills and man-made bodies of water.

Still another object of the present invention is to provide an improved method for constructing a low permeability bentonite layer in the bottom of landfills and man-made bodies of water.

BRIEF DESCRIPTION OF THE DRAWINGS

This invention is illustrated more or less diagrammatically in the accompanying drawings, wherein.

Figure 1:
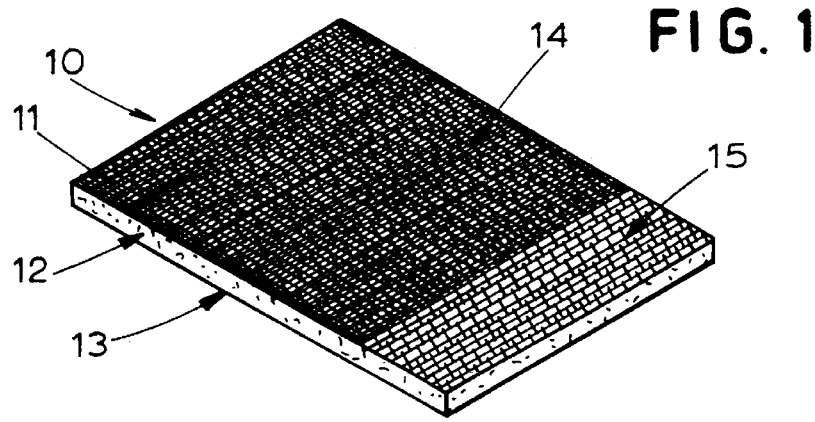
FIG. 1 is a perspective view of a geosynthetic clay liner made in accordance with the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Like reference numerals will be used to refer to like or similar parts from Figure to Figure in the following descriptions of the drawings.

FIG. 1 is an illustration of the geosynthetic clay liner 10 including an upper cover sheet 11, a bentonite layer 12 and a lower carrier sheet 13. All of the Figures and the description below depict the cover sheet as the top sheet when installed and the carrier sheet as the bottom sheet when installed. It will be understood that the installation design may warrant reversal of this configuration and the present invention applies equally to both configurations.

The upper cover sheet 11 includes a central portion, indicated generally at 14 and an outer longitudinal section, indicated generally at 15. The reader will note that the central portion 14 is more tightly woven or has a more closed structure and the outer longitudinal section 15 has a more open structure. The central portion 14 has a higher warp count than the warp count of the outer longitudinal section 15 or the longitudinal section 15 is perforated or needle-punched and the central portion 14 is not. The more open longitudinal section 15 provides for substantial migration of the bentonite 12 up through the longitudinal section 15 upon activation of the bentonite 12 with an activating fluid, such as water.

Figure 2:
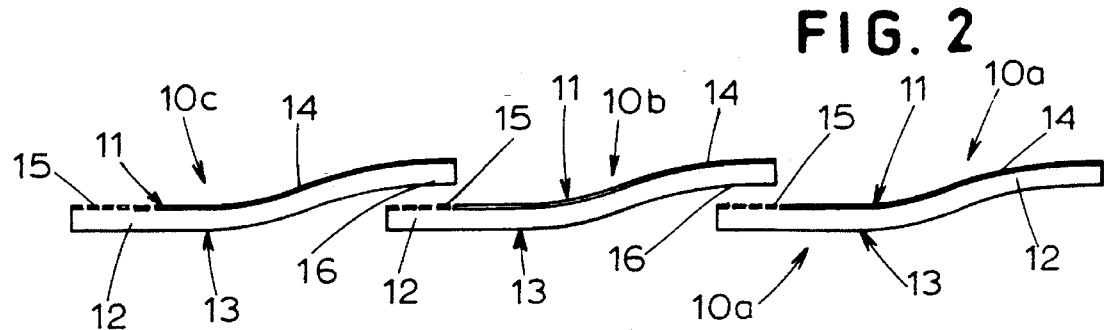
FIG. 2 is a front sectional view showing an installation of three adjacent geosynthetic clay liners made in accordance to the present invention.

An illustration of the installation of the geosynthetic clay liner 10, like the one shown in FIG. 1, is illustrated in FIG. 2. A first geosynthetic clay liner 10a is laid down on the bottom of a landfill or pond (not shown). The geosynthetic clay liner 10a includes an upper cover sheet 11 that includes a more open longitudinal section 15. A second geosynthetic clay liner 10b is laid down with an outer end 16 overlapping the more open longitudinal section 15. A third geosynthetic clay liner 10c is laid down with an outer portion 16 disposed on top of the more open longitudinal section 15 of the geosynthetic liner 10b.

Upon activation by water, the bentonite 12 migrates upward through the more open longitudinal sections 15 and engages the lower carrier sheets 13 of the geosynthetic clay liners 10c and 10b as illustrated in FIG. 2. The expanding and migrating bentonite 12 forms a seal between the bentonite layers disposed between the cover sheet 11 and carrier sheet 13 of one geosynthetic clay liner such as 10a, 10b and the lower carrier sheet 13 of the adjacent clay liner such as 10b, 10c.

Figure 3:
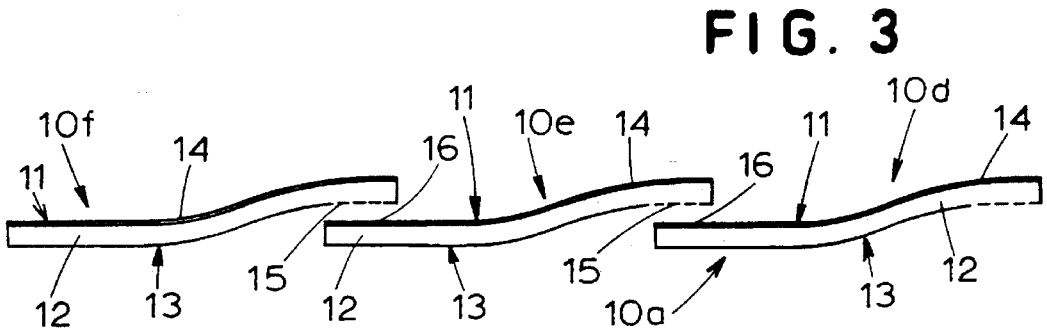
FIG. 3 is another front sectional view of an installation of three adjacent geosynthetic clay liners made in accordance with the present invention.

In FIG. 2, the more open longitudinal section 15 is provided at one outer edge of each upper cover sheet 11. In FIG. 3, the more open longitudinal section 15 are provided at an outer edge of each lower carrier sheet 13. Referring to FIGS. 2–6 collectively, in order to affect a seal between the geosynthetic clay liners 10 (actually 10a through 10n), the more open longitudinal sections 15 must be arranged so that they engage the overlapping portion 16 of an adjacent carrier sheet as shown in FIGS. 2 through 6.

Figure 4:
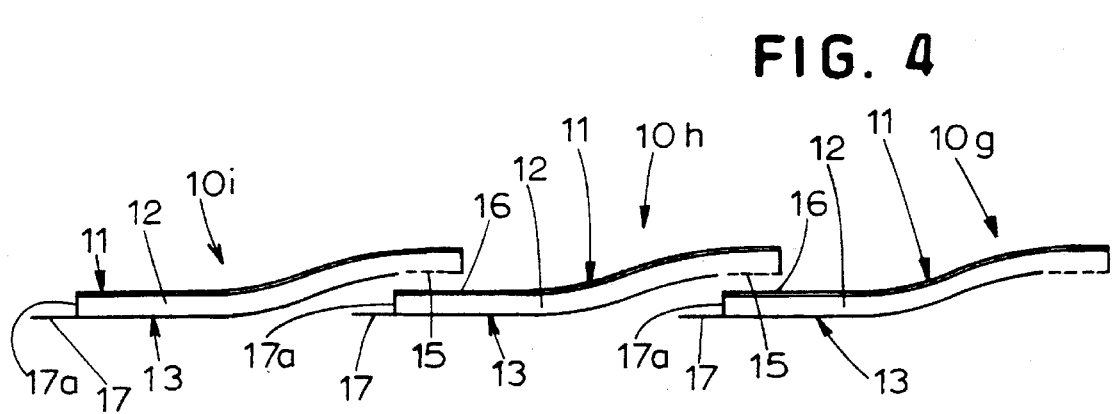
FIG. 4 is another front sectional view showing an installation of three geosynthetic clay liners made in accordance with the present invention.
Figure 5:
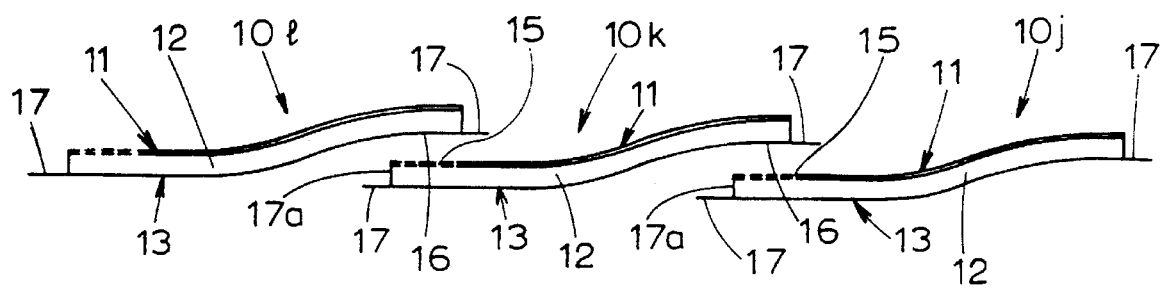
FIG. 5 is another front sectional view of an installation of three geosynthetic clay liners made in accordance with the present invention.

FIGS. 4 and 5 illustrate an alternative embodiment of the present invention where the liners 10i through 10j include an overlap sheet or extension 17. The overlap sheets 17 are intended to prevent any substantial downward migration of the bentonite 12 which might clog or otherwise interfere with a drainage system disposed below the geosynthetic clay liners 10.

For example, referring to FIG. 4, the bentonite 12, upon activation, will migrate downward through the more open longitudinal sections 15 and engage the outer ends 16 of the adjacent geosynthetic clay liners 10h, 10g. Any excess bentonite 12 migrating through the longitudinal sections 15 and over the outer overlapping edge 16 will be contained by the overlap sheet 17. The overlap sheet 17 is an extension of the lower carrier sheet 13 or may be a separate sheet attached thereto. Preferably, the overlap sheets 17 are made from a material that allows little migration of bentonite 12. FIG. 5 illustrates a variation of the concept illustrated in FIG. 4, only with overlap extensions 17 disposed on both outer edges of each lower carrier sheet 13. The bentonite 12 of the liners 10j, 10k, 10l will migrate through the loosely woven longitudinal sections 15. Any bentonite 12 migrating out of the outer edges 17a will be contained by the overlapping sections 17.

Figure 6:
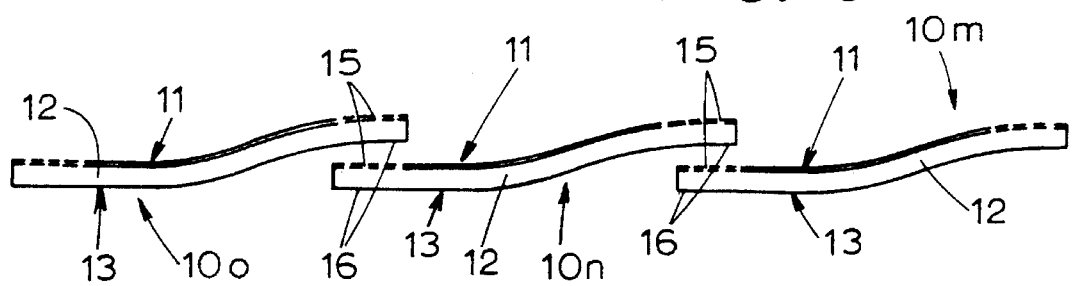
FIG. 6 is another front sectional view of the preferred installation of three geosynthetic clay liners made in accordance with the present invention.

FIG. 6 illustrates a variation of the concept illustrated in FIG. 2, only with loosely woven longitudinal sections 15 disposed on both edges 15 of each cover sheet 11 of each overlapping geosynthetic clay liner 10m, 10n, 10o.

Figure 7:
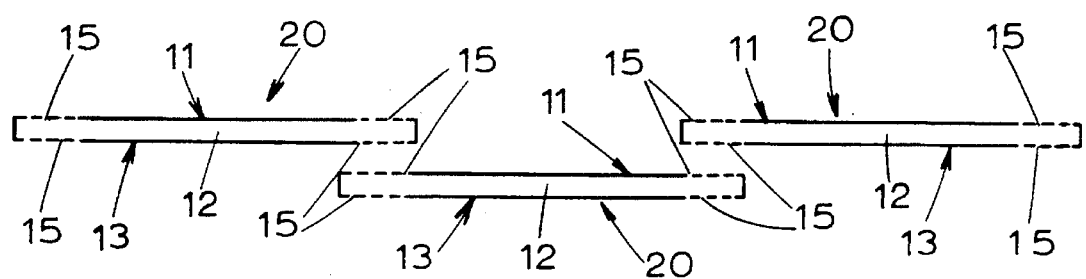
FIG. 7 is another front sectional view of an installation of three geosynthetic clay liners made in accordance with the present invention.
Figure 8:
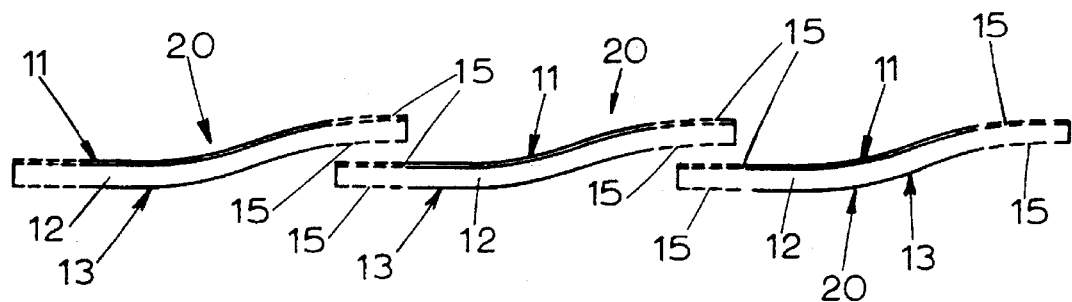
FIG. 8 is an alternative installation scheme used with the geosynthetic clay liners shown in FIG. 7.

FIG. 7 is an illustration of a liner system incorporating geosynthetic clay liners 20 equipped with more open longitudinal sections 15 disposed on both outer edges of both the upper cover sheet 11 and the lower primary carrier sheet 13. FIG. 8 is an illustration of an alternative installation scheme used with the geosynthetic liners 20 first shown in FIG. 7.

The preferred material for fabrication of the carrier sheets is fabric woven from slit film polypropylene fibers. The slit film fibers may have a width from 1/32 to 1/8-inch. The longitudinal sections should be at least 3 inches wide and normally not more than 24 inches wide and preferably from about 6 to about 12 inches wide. The overlap sheets should be at least 6 inches wide and no more than 3 feet wide and preferably from about 18 inches to about 2 feet wide.

Figure 9:
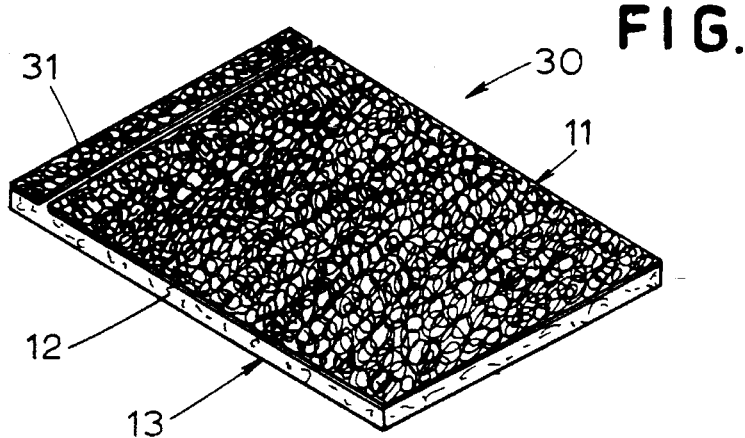
FIG. 9 is a perspective view of yet another geosynthetic clay liner made in accordance with the present invention.
Figure 10:
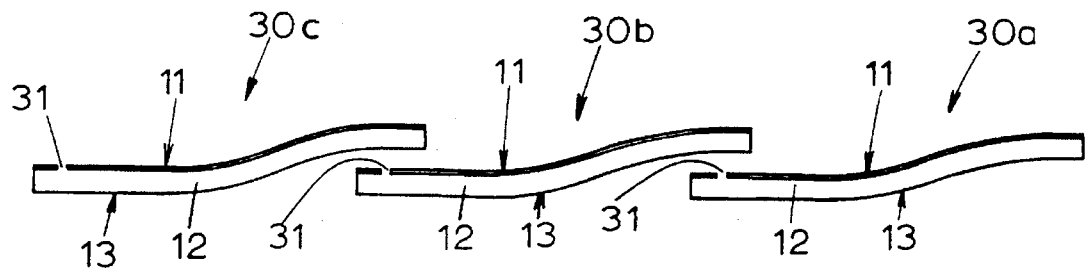
FIG. 10 is a front sectional view showing an installation of three adjacent geosynthetic clay liners made in accordance with the present invention.

FIG. 9 illustrates an additional liner 30 that employs a different scheme for bentonite migration at an outer longitudinal section or outer edge to effectuate a seal between the liner 30 and an adjacent liner. Specifically, the liner 30 includes a slit 31 disposed along an outer edge of the liner. The bentonite 12 will migrate upward through the slit 31 to engage an underside of an adjacent liner as shown in FIG. 10. Still referring to FIG. 1, the slit 31 may be easily cut into the cover sheet 11 if the cover sheet 11 is fabricated from non-woven material. An additional method of disposing the slit 31 in the non-woven cover sheet 11 would be to melt the slit 31 into the cover sheet 11 assuming the cover sheet 11 is fabricated from a low-melting point material, such as polypropylene. In fact, polypropylene is a preferred material for the fabrication of non-woven geotextile sheets and therefore it is anticipated that melting the slit 31 in a polypropylene non-woven cover sheet 11 will be as feasible a method as cutting the slit 31 into the cover sheet 11.

Turning to FIG. 10, an installation of three liners 30a–30c is illustrated. A first geosynthetic clay liner 30a is laid down on the bottom of a landfill or pond (not shown). The geosynthetic clay 30a includes an upper cover sheet 11 with a slit 31 disposed parallel to an outer edge thereof. An outer edge of the adjacent liner 30b is laid on top of the slit 31 of the liner 30a. Upon activation, some of the bentonite 12 will migrate upward through the slit 31 to engage an outer edge of the primary carrier sheet 13 of the adjacent liner.

Figure 11:
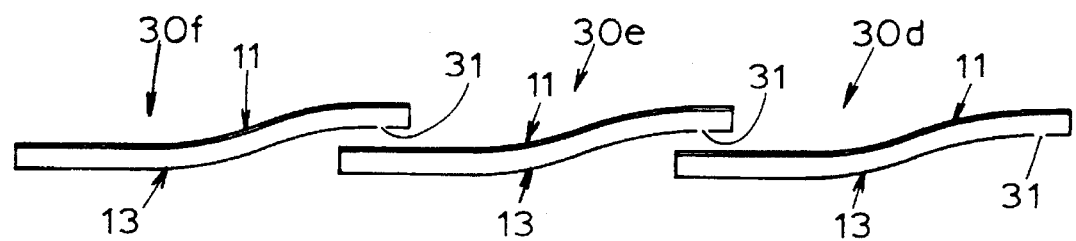
FIG. 11 is another front sectional view of an installation of three adjacent geosynthetic clay liners made in accordance with the present invention.

In FIG. 11, the configuration of the liners 30d–30f is reversed from the configuration of the liners 30a–30c as shown in FIG. 10. That is, the primary carrier sheet 13 is fabricated from non-woven material and includes a slit 31. Therefore, bentonite 12 migrates downward through the slit 31 disposed in the non-woven primary carrier sheet 13 where it will bond with the cover sheet of an adjacent liner. In the configuration shown in FIG. 11, the cover sheet 11 may be fabricated from woven or non-woven materials. However, because a slit 31 is not easily cut or burned into a woven material, the primary carrier sheet 13 is preferably fabricated from non-woven material, such as polypropylene or other low-melting point materials which will become apparent to those skilled in the art.

Figure 12:
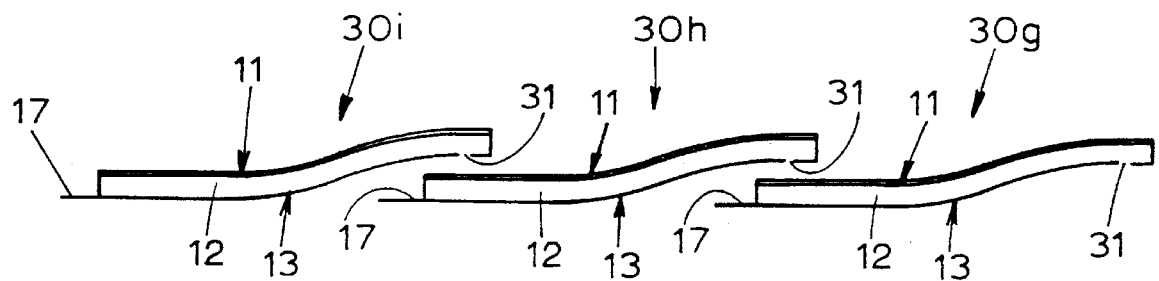
FIG. 12 is another front sectional view of an installation of three adjacent geosynthetic clay liners made in accordance with the present invention.

FIG. 12 is an illustration of the configuration shown in FIG. 11 but each carrier sheet includes an overlap sheet 17 to preclude any downward migration of bentonite 12 past the liners 30g–30i as illustrated in FIG. 4 with respect to the liners 10g–10i.

Figure 13:
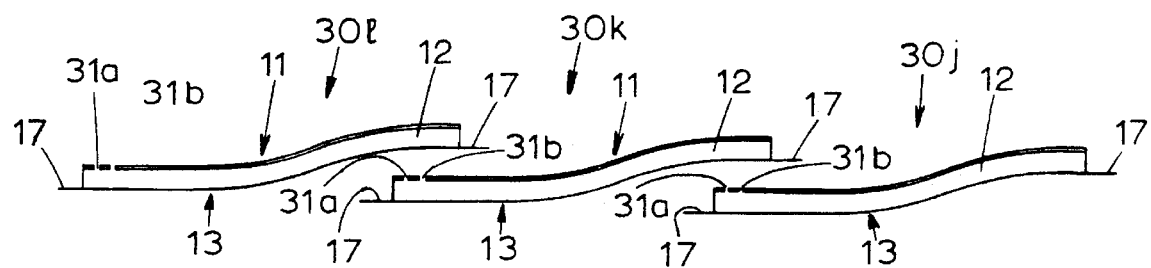
FIG. 13 is another front sectional view of an installation of three adjacent geosynthetic clay liners made in accordance with the present invention.
Figure 14:
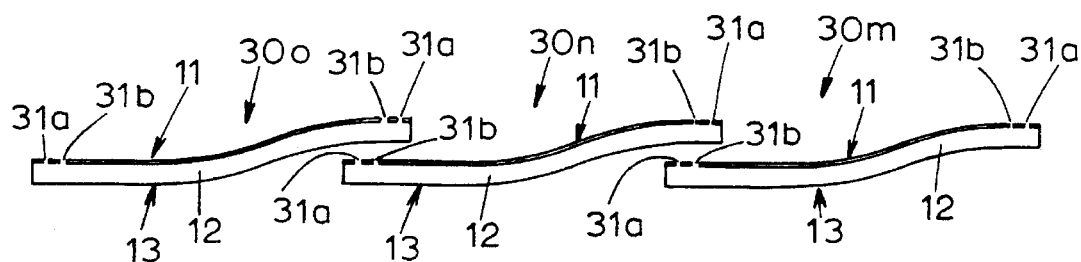
FIG. 14 is another front sectional view of an installation of three adjacent geosynthetic clay liners made in accordance with the present invention.

FIGS. 13 and 14 illustrate the use of two slits 31a, 31b disposed along an outer edge of each cover sheet 11. The parallel slits 31a, 31b may be either cut or melted into the non-woven cover sheet 11 with parallel cutting blades or parallel melting instruments. It will also be noted in FIG. 13 that the primary carrier sheet 13 of the liners 30j–30l include dual extension flaps 17 to prevent the downward migration of bentonite 12 below the liners 30j–30l. In FIG. 14, the liners 30m–30o include the dual slits 31a, 31b but do not include any extension flaps.

Figure 15:
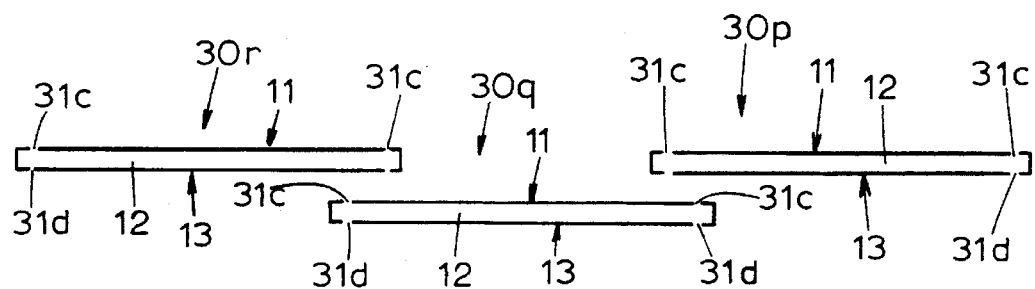
FIG. 15 is another front sectional view of an installation of three adjacent geosynthetic clay liners made in accordance with the present invention.
Figure 16:
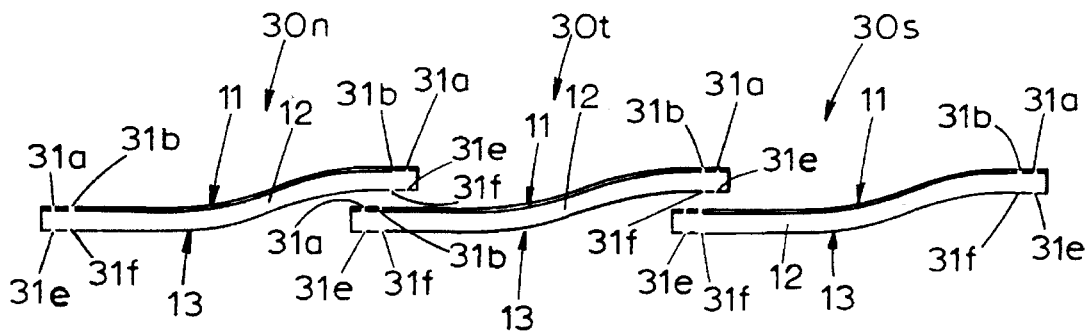
FIG. 16 is another front sectional view of an installation of three adjacent geosynthetic clay liners made in accordance with the present invention.

FIGS. 15 and 16 disclose liners with slits or grooves 31 disposed in both the cover sheet 11 and primary carrier sheet 13. For example, in FIG. 15, the liners 30p–30r include a pair of upper slits 31c and lower slits 31d so that the bentonite 12 will migrate both upward through the cover sheet 11 and downward through the primary carrier sheet 13. Finally, FIG. 16 discloses the use of adjacent slits 31a, 31b disposed along each outer edge of the cover sheet 11 as well as adjacent slits 31e, 31f disposed along each outer edge of the primary carrier sheet 13 as illustrated with respect to the liners 30s–30u.

As noted above, the preferred material for use in constructing non-woven sheets that will accommodate one or more slits is polypropylene. One preferred material for the woven geotextile sheets is known as Amoco 4005. Amoco 4005 is a slit film woven polypropylene fabric that has been needle-punched with one to one and one-half ounces per square yard of staple polypropylene fibers of approximately 6 denier. The construction of the weave is approximately 24 warp and 12 weft slit film fibers per inch in a flat woven pattern. This fabric has been found to be an effective primary carrier sheet or primary carrier 13. A looser, more open weave is employed for the longitudinal section 15 if it is disposed at an outer edge of a primary carrier sheet 13 made with Amoco 4005.

By using the geosynthetic clay liners 10, 20 or 30 of the present invention, geotechnical engineers are ensured that minimal leakage will occur in the clay barrier provided by the bentonite 12. Construction of the barrier at the bottom of landfills and man-made bodies of water will be fast and efficient because no additional effort is required to seal the seams between two adjacent liners. The geosynthetic clay liners of the present invention are self-sealing at the seams between adjacent overlapping liners.

While only a selection of specific embodiments of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording and the foregoing description.

We claim:

1. A geosynthetic clay liner comprising:

a clay layer disposed between a primary geosynthetic carrier sheet and a geosynthetic cover sheet, the cover sheet including a central portion having a more closed structure than a longitudinal outer edge section of the cover sheet, and said longitudinal edge section having a more open structure than said central portion of the cover sheet, said more open structure provided by a slit extending along said longitudinal outer edge section, the slit allowing substantial migration of activated clay through the slit, and activated clay migrating through the slit to create an activated clay seal between the cover sheet of the geosynthetic clay liner and a primary carrier sheet of an adjacent geosynthetic clay liner disposed below the slit.

2. The clay liner of claim 1, wherein the longitudinal outer edge section of the cover sheet includes two parallel slits.

3. The clay liner of claim 1, wherein the cover sheet includes two opposed longitudinal edge sections, each having a slit therein.

4. The clay liner of claim 1, wherein the cover sheet is fabricated from non-woven material.

5. A geosynthetic clay liner comprising:

a clay layer disposed between a primary geosynthetic carrier sheet and a geosynthetic cover sheet, the primary carrier sheet including a central portion having a more closed structure than a longitudinal outer edge section of the primary carrier sheet, and said longitudinal edge section having a more open structure than said central portion of the primary carrier sheet, said more open structure provided by a slit extending along said longitudinal outer edge section, the slit allowing substantial migration of activated clay through the slit, and activated clay migrating through the slit to create an activated clay seal between the primary carrier sheet of the geosynthetic clay liner and a cover sheet of an adjacent geosynthetic clay liner disposed above the slit.

6. The geosynthetic clay liner of claim 5, wherein the primary carrier sheet includes two opposed longitudinal edge sections, each having a slit therein.

7. The geosynthetic clay liner of claim 5, wherein the cover sheet includes two opposed longitudinal edge sections, each having a slit therein.

8. The geosynthetic clay liner of claim 5, wherein the primary carrier sheet is fabricated from non-woven material.

9. A geosynthetic clay liner for use in forming a continuous clay layer that is substantially impervious to fluids, the geosynthetic clay liner comprising:

a cover sheet made of non-woven geosynthetic fabric, a primary carrier sheet made of woven geosynthetic fabric, at least one clay layer disposed between the cover sheet and the primary carrier sheet, the clay layer, the cover sheet and the primary carrier sheet having outer edges in matching registry, the cover sheet including a central portion having a more closed structure than a longitudinal outer edge section of the cover sheet, and said longitudinal edge section having a more open structure than said central portion of the cover sheet, said more open structure provided by at least one slit extending along the outer edge thereof for overlapping said primary carrier sheet of an adjacent geosynthetic clay liner, and the clay layer, after activation by an activating fluid, at least partially migrating upwardly through the slit of the cover sheet to engage the primary carrier sheet of the adjacent geosynthetic clay liner to provide an activated clay seal between the slit of the cover sheet and the primary carrier sheet of the adjacent geosynthetic clay liner.

10. A geosynthetic clay liner for use in forming a continuous clay layer that is substantially impervious to fluids, the geosynthetic clay liner comprising:

a cover sheet made of woven geosynthetic fabric, a primary carrier sheet made of non-woven geosynthetic fabric, at least one clay layer disposed between the cover sheet and the primary carrier sheet, the clay layer, the cover sheet and the primary carrier sheet having outer edges in matching registry, the primary carrier sheet including a central portion having a more closed structure than a longitudinal outer edge section of the primary carrier sheet, and said longitudinal edge section having a more open structure than said central portion of the primary carrier sheet, said more open structure provided by at least one slit extending along the outer edge thereof for overlapping said cover sheet of an adjacent geosynthetic clay liner, and the clay layer, after activation by an activating fluid, at least partially migrating downwardly through the slit of the primary carrier sheet to engage the cover sheet of the adjacent geosynthetic clay liner to provide an activated clay seal between the slit of the primary carrier sheet and the cover sheet of the adjacent geosynthetic clay liner.

11. A geosynthetic clay liner for use in forming a continuous clay layer that is substantially impervious to fluids, the geosynthetic clay liner comprising:

a clay layer disposed between at least one primary geosynthetic carrier sheet and at least one geosynthetic cover sheet, the cover sheet, the clay layer and the primary carrier sheet forming the geosynthetic clay liner, the geosynthetic clay liner including longitudinal outer edges, said primary carrier sheet including a central portion having a more closed structure than a longitudinal outer edge section of the primary carrier sheet, and said longitudinal edge section having a more open structure than said central portion of the primary carrier sheet, said more open structure provided by at least one slit disposed in said longitudinal outer edge of the primary carrier sheet, the slit permitting substantial migration of activated clay through the slit, the slit engaging at least a portion of an adjacent geosynthetic clay liner, and the activated clay migrating through the slit to create a seal between two adjacent geosynthetic clay liners by creating an activated clay seal between the slit of one geosynthetic clay liner and an adjacent geosynthetic clay liner.

12. The clay liner of claim 11, wherein the primary carrier sheet is fabricated from non-woven material.

13. A geosynthetic clay liner for use in forming a continuous clay layer that is substantially impervious to fluids the geosynthetic clay liner comprising:

a clay layer disposed between at least one primary geosynthetic carrier sheet and at least one geosynthetic cover sheet, the cover sheet, the clay layer and the primary carrier sheet forming the geosynthetic clay liner, the geosynthetic clay liner including longitudinal outer edges, said cover sheet including a central portion having a more closed structure than a longitudinal outer edge section of the cover sheet, and said longitudinal edge section having a more open structure than said central portion of the cover sheet, said more open structure provided by at least one slit disposed in said longitudinal outer edge of the cover sheet, the slit permitting substantial migration of activated clay through the slit, the slit engaging at least a portion of an adjacent geosynthetic clay liner, and the activated clay migrating through the slit to create a seal between two adjacent geosynthetic clay liners by creating an activated clay seal between the slit of one geosynthetic clay liner and an adjacent geosynthetic clay liner.

14. The clay liner of claim 13, wherein the cover sheet is fabricated from non-woven material.

15. A lining system for containing liquid, the system comprising:

a plurality of geosynthetic clay liners, each geosynthetic clay liner including at least one clay layer, each clay layer disposed between at least one primary geosynthetic carrier sheet and at least one geosynthetic cover sheet, each primary carrier sheet including a central portion having a more closed structure than a longitudinal outer edge section of the primary carrier sheet, and said longitudinal edge section having a more open structure than said central portion of the primary carrier sheet, said more open structure provided by at least one slit disposed in said longitudinal outer edge thereof, the slit of one geosynthetic clay liner engaging at least a portion of an adjacent geosynthetic clay liner, the slit of each primary carrier sheet permitting substantial migration of activated clay through the slit, the slit engaging at least a portion of an adjacent geosynthetic clay liner, and activated clay migrating through the slit creating a seal between two adjacent geosynthetic clay liners by creating an activated clay seal between the slit of one geosynthetic clay liner and the cover sheet of an adjacent geosynthetic clay liner.

16. A lining system for containing liquid, the system comprising:

a plurality of geosynthetic clay liners, each geosynthetic clay liner including at least one clay layer, each clay layer disposed between at least one primary geosynthetic carrier sheet and at least one geosynthetic cover sheet, each cover sheet including a central portion having a more closed structure than a longitudinal outer edge section of the cover sheet, and said longitudinal edge section having a more open structure than said central portion of the cover sheet, said more open structure provided by at least one slit disposed along an outer edge thereof, the slit of one geosynthetic clay liner engaging at least a portion of an adjacent geosynthetic clay liner, the slit of each cover sheet permitting substantial migration of activated clay through the slit, the slit engaging at least a portion of an adjacent geosynthetic clay liner, and activated clay migrating through each slit creating a seal between two adjacent geosynthetic clay liners by creating an activated clay seal between the slit of one geosynthetic clay liner and the primary carrier sheet of an adjacent geosynthetic clay liner.

17. A method for manufacturing a continuous clay layer that is substantially impervious to migrating liquids, the method comprising:

covering an area with a plurality of geosynthetic clay liners, each geosynthetic clay liner including
a geosynthetic cover sheet, a geosynthetic primary carrier sheet and at least one clay layer disposed therebetween, the clay layer, the cover sheet and the primary carrier sheet having longitudinal outer edges in matching registry, the cover sheet including a central portion having a more closed structure than a longitudinal outer edge section of the cover sheet, and said longitudinal edge section having a more open structure than said central portion of the cover sheet, said more open structure provided by a slit disposed along an outer edge thereof for overlapping a primary carrier sheet of an adjacent geosynthetic clay liner, the slit of the cover sheet allowing the clay layer, after activation by an activating fluid, to at least partially migrate upwardly through the slit of the cover sheet to engage the primary carrier sheet of the adjacent geosynthetic clay liner disposed above the slit of the cover sheet to provide an activated clay seal between the slit of the cover sheet and the primary carrier sheet of the adjacent geosynthetic clay liner, engaging the slit of each cover sheet with at least a portion of a primary carrier sheet of an adjacent geosynthetic clay liner, and activating the clay layers with an activating liquid to permit upward migration of activated clay through the slit of the cover sheet to engage the portion of the primary carrier sheet of the adjacent geosynthetic clay layer.

18. A method for providing a continuous clay layer that is substantially impervious to migrating liquids, the method comprising:

covering an area with a plurality of geosynthetic clay liners, each geosynthetic clay liner including
geosynthetic cover sheet, a geosynthetic primary carrier sheet and at least one clay layer disposed therebetween, the clay layer, the cover sheet and the primary carrier sheet having longitudinal outer edges in matching registry, the primary carrier sheet including a central portion having a more closed structure than a longitudinal outer edge section of the primary carrier sheet, and said longitudinal edge section having a more open structure than said central portion of the primary carrier sheet, said more open structure provided by a slit disposed along said longitudinal outer edge thereof for overlapping a cover sheet of an adjacent geosynthetic clay liner, the slit allowing the clay layer, after activation by an activating fluid, to at least partially migrate downward through the slit of the primary carrier sheet to engage the cover sheet of the adjacent geosynthetic clay liner disposed below the slit of the primary carrier sheet to provide an activated clay seal between the slit of the primary carrier sheet and the cover sheet of the adjacent geosynthetic clay liner, engaging a slit of each primary carrier sheet with at least a portion of a cover sheet of an adjacent geosynthetic clay liner, and activating the clay layers with an activating liquid to permit downward migration of activated clay through the slit of the primary carrier sheet to engage the portion of the cover sheet of the adjacent geosynthetic clay liner.

\* \* \* \* \*

UNITED STATES PATENT AND TRADEMARK OFFICE
CERTIFICATE OF CORRECTION

PATENT NO. : 5,529,438
DATED : June 25, 1996
INVENTOR(S) : Carriker et al.

It is certified that error appears in the above-identified patent and that said Letters Patent is hereby corrected as shown below:

Column 12,
Line 32, "geosynthetic cover" should read as -- a geosynthetic cover --.

Signed and Sealed this

Twentieth Day of August, 2002

Attest:

Attesting Officer

JAMES E. ROGAN
Director of the United States Patent and Trademark Office